(12) United States Patent
Chen et al.

(10) Patent No.: US 7,458,636 B2
(45) Date of Patent: Dec. 2, 2008

(54) CHILD SAFETY SEAT ASSEMBLY WITH BUCKLE POSITIONING MEMBER

(75) Inventors: Shun-Min Chen, Taipei (TW); Curtis M. Hartenstine, Birdsboro, PA (US)

(73) Assignee: Wonderland Nurserygoods Co., Ltd., Taipei (TW)

( * ) Notice: Subject to any disclaimer, the term of this patent is extended or adjusted under 35 U.S.C. 154(b) by 159 days.

(21) Appl. No.: 11/327,895

(22) Filed: Jan. 9, 2006

(65) Prior Publication Data

US 2007/0052269 A1 Mar. 8, 2007

(30) Foreign Application Priority Data

Sep. 5, 2005 (CN) .................. 2005 2 0118621

(51) Int. Cl.
*A47D 1/10* (2006.01)
*B60R 22/00* (2006.01)
*A44B 21/00* (2006.01)

(52) U.S. Cl. .................. 297/250.1; 297/481; 280/801.1; 24/301

(58) Field of Classification Search .......... 297/256.13, 297/250.1, 256.16, 481, 468, 423; 280/801.1; 24/300, 301; 248/505
See application file for complete search history.

(56) References Cited

U.S. PATENT DOCUMENTS

| | | | | |
|---|---|---|---|---|
| 3,136,579 A | * | 6/1964 | Hunter | .................... 297/250.1 |
| 3,547,489 A | * | 12/1970 | Grieser | ........................ 297/468 |
| 4,083,602 A | * | 4/1978 | Mori et al. | .................. 297/481 |
| 4,231,613 A | | 11/1980 | Jonasson et al. | |
| 4,461,510 A | * | 7/1984 | Cunningham et al. | ..... 297/250.1 |
| 5,678,887 A | * | 10/1997 | Sher | ........................ 297/250.1 |
| 7,104,570 B2 | * | 9/2006 | Hearn et al. | ............. 280/801.1 |

FOREIGN PATENT DOCUMENTS

| | | |
|---|---|---|
| DE | 2357307 | 5/1975 |
| EP | 1059194 A1 | 12/2000 |
| EP | 1393967 A1 | 3/2004 |
| FR | 2512658 | 3/1983 |
| FR | 2539287 | 7/1984 |
| GB | 1173891 | 12/1969 |
| JP | 6055963 | 3/1994 |
| JP | 2002079909 | 3/2002 |

* cited by examiner

*Primary Examiner*—David Dunn
*Assistant Examiner*—Tania Abraham
(74) *Attorney, Agent, or Firm*—Whyte Hirschboeck Dudek SC (57) ABSTRACT

A child safety seat assembly for mounting on a vehicle seat includes: a seat body having two opposite lateral sides; and a buckle-positioning member that is provided on the seat body and that is operable to hold a buckle provided on the vehicle seat at one of the lateral sides of the seat body.

6 Claims, 8 Drawing Sheets

CHILD SAFETY SEAT ASSEMBLY WITH BUCKLE POSITIONING MEMBER

CROSS-REFERENCE TO RELATED APPLICATION

This application claims priority of Chinese Patent Application No. 200520118621.6, filed on Sep. 5, 2005.

BACKGROUND OF THE INVENTION

1. Field of the Invention

The invention relates to a child safety seat assembly, more particularly to a child safety seat assembly with a buckle positioning member.

2. Description of the Related Art

Car safety belt devices are generally designed based on an average size of adults. As a result, when used on a child, the safety belt device is unable to make the child sit firmly on the seat when the car rocks or vibrates. Moreover, when the car is suddenly braked, the safety belt device may strangle the child.

Figure 1:
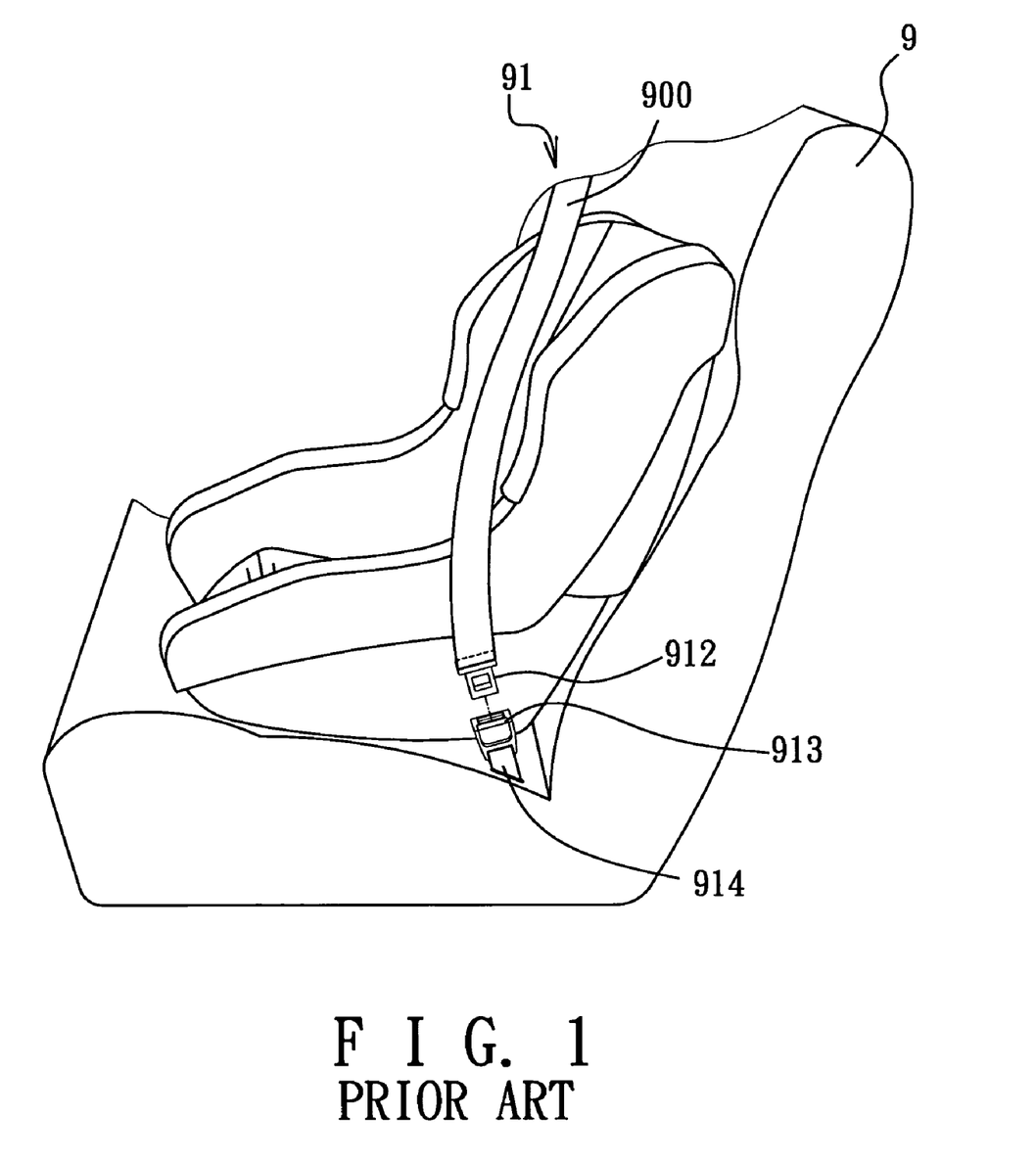
FIG. 1 is a perspective view of a conventional child safety seat mounted on a car seat.

As shown in FIG. 1, a conventional child safety seat is mounted removably on a rear seat 9 of a car. A safety belt device 91 is coupled to the rear seat 9 for safety purposes, and includes a safety belt 900 secured to one side of the car seat 9, a catch 912 connected to a free end of the safety belt 900, a connecting belt 914 secured to another side of the car seat 9, and a buckle 913 connected to a free end of the connecting belt 914 and engageable with the catch 912. In use, the safety belt 900 crosses a front side of the child safety seat for firmly holding the child safety seat on the car seat 9.

Since the connecting belt 914 together with the buckle 913 is movably disposed on the car seat 9, operation of the catch 912 for engaging the buckle 913 cannot be conducted instantly and conveniently, particularly when it is dark inside the car. In addition, it is not easy for a child seating on the child safety seat to gain access to the buckle 913.

SUMMARY OF THE INVENTION

Therefore, the object of the present invention is to provide a child safety seat assembly that can overcome the aforesaid drawbacks associated with the prior art.

According to this invention, there is provided a child safety seat assembly that is adapted to be mounted on a vehicle seat with a safety belt unit that includes a first belt provided with a catch, and a second belt provided with a buckle for engaging the catch. The child safety seat assembly comprises: a seat body having two opposite lateral sides; and a buckle-positioning member that is provided on the seat body and that is operable to hold the buckle at one of the lateral sides of the seat body.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail with reference to the accompanying preferred embodiments, it should be noted herein that like elements are denoted by the same reference numerals throughout the disclosure.

Figure 2:
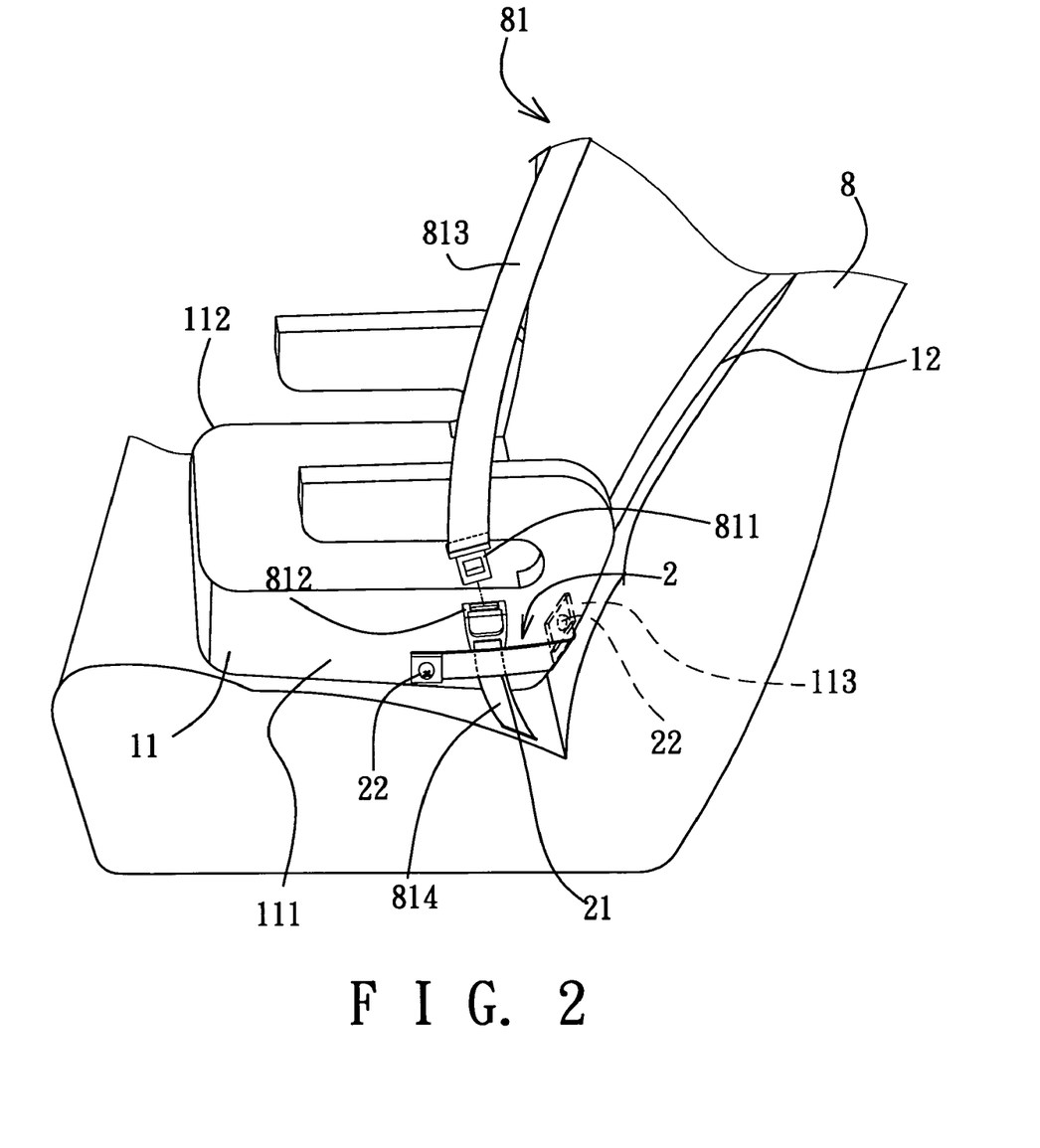
FIG. 2 is a fragmentary perspective view of the first preferred embodiment of a child safety seat assembly according to the present invention, illustrating how the child safety seat assembly is used with a safety belt device provided on a car seat.

Referring to FIG. 2, the first preferred embodiment of a child safety seat assembly according to the present invention is shown to be adapted to be mounted on a vehicle seat 8 with a safety belt unit 81 that includes a first belt 813 having a free end that is provided with a catch 811, and a second belt 814 having a free end that is provided with a buckle 812 for engaging the catch 811. The child safety seat assembly includes: a seat body 11 having two opposite lateral sides 111, 112 and a rear side 113 interconnecting the lateral sides 111, 112; and a buckle-positioning member 2 that is provided on the seat body 11 and that is operable to hold or to position the buckle 812 at one of the lateral sides, such as the lateral side 111, of the seat body 11, and to restrain the second belt 814 along the lateral side 111 of the seat body 11. The arrangement of the buckle-positioning member 2 can facilitate operation of engaging the catch 811 with the buckle 812.

The buckle-positioning member 2 includes a fastening belt 21 that has one end portion secured to the rear side 113 of the seat body 11, and the other end portion secured to the lateral side 111 so as to cooperate with the lateral side 111 of the seat body 11 to define a gap. The buckle 812 and a portion of the second belt 814 that is connected to the buckle 812 can be extended through the gap, thereby holding the buckle 812 at the lateral side 111 of the seat body 11 through the fastening belt 21. In this embodiment, the fastening belt 21 is elastic.

The buckle-positioning member 2 further includes fastening screws 22 for fastening two end portions of the fastening belt 21 to the lateral side 111 and the rear side 113 of the seat body 11.

Alternatively, the two end portions of the fastening belt 21 may be fastened to either one of the two lateral sides 111, 112 of these a body 11 or fastened respectively to the lateral side 112 and the rear side 113. Moreover, to enhance user convenience, two buckle-positioning members 2 can be mounted respectively on the lateral sides 111, 112 of the seat body 11.

Figure 3:
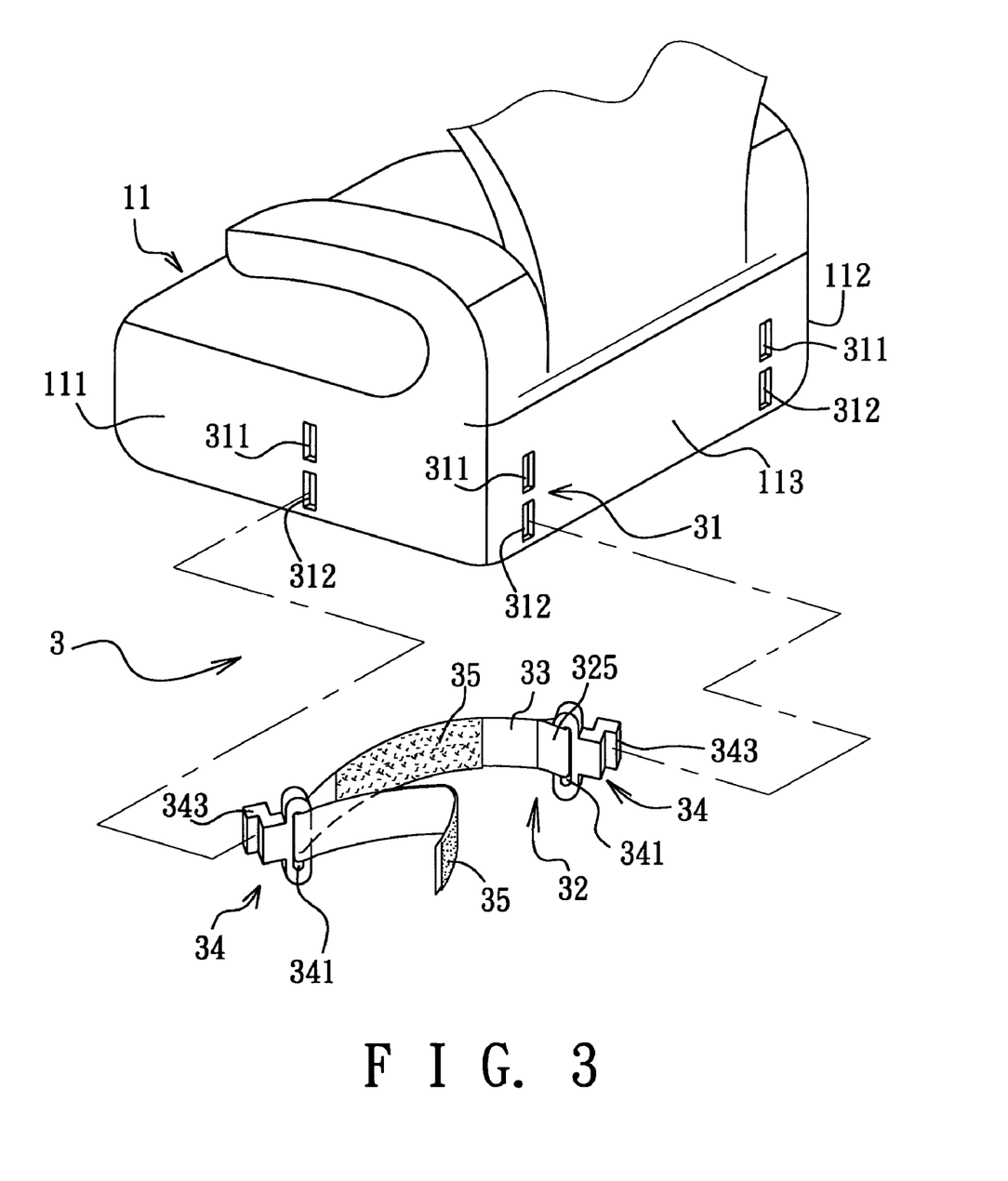
FIG. 3 is a fragmentary perspective view of the second preferred embodiment of a child safety seat assembly according to the present invention.

Referring to FIG. 3, the second preferred embodiment of this invention has a structure similar to that of the first preferred embodiment, except that each of the rear side 113 and said one of the lateral sides 111, 112 of the seat body 11 is formed with a retaining hole unit 31 that has at least one retaining hole (in this embodiment, there are two retaining holes 311, 312). The buckle-positioning member 3 further includes a pair of connecting parts 34 connected respectively to the end portions of the fastening belt 32. Each of the connecting parts 34 has a frame body 341, and is formed with an insert 343 extending therefrom and fitted removably into a selected one of the retaining holes 311, 312 in the rear side 113 and one of the lateral sides 111, 112 of the seat body 11. The fastening belt 32 further has a middle section 33 extending between the end portions of the fastening belt 32, and hook-and-loop fastening means 35 provided on the middle section 33 of the fastening belt 32 and the end portion of the fastening belt 32. One of the end portions of the fastening belt 32, which is to be secured to the rear side 113, is formed with a first loop 325 around a frame portion of the frame body 341 of the respective one of the connecting parts 34. The other of the end portions of the fastening belt 32 extends through the frame body 341 of the respective one of the connecting parts 34, and is attached to the middle section 33 of the fastening belt 32 through the hook-and-loop fastening means 35 so as to form a second loop around a frame portion of the frame body 341 of the respective one of the connecting parts 34 and so as to permit distance adjustment between the connecting parts 34 by virtue of the hook-and-loop fastening means 35. In this embodiment, the hook-and-loop fastening means 35 includes a Velcro (™) hook-and-loop fastener. The buckle-positioning member 3 can be detached from the seat body 11 by disengaging the inserts 343 of the connecting parts 34 from the respective retaining holes 311, 312, thereby permitting movement of the buckle-positioning member 3 together with the seat body 11 when the position of the seat body 11 is to be changed from one side of a car seat (not shown) to an opposite side of the car seat. Moreover, the buckle-positioning member 3 can be adjusted in height by inserting the inserts 343 into upper or lower ones of the retaining holes 31, 312.

Figure 4:
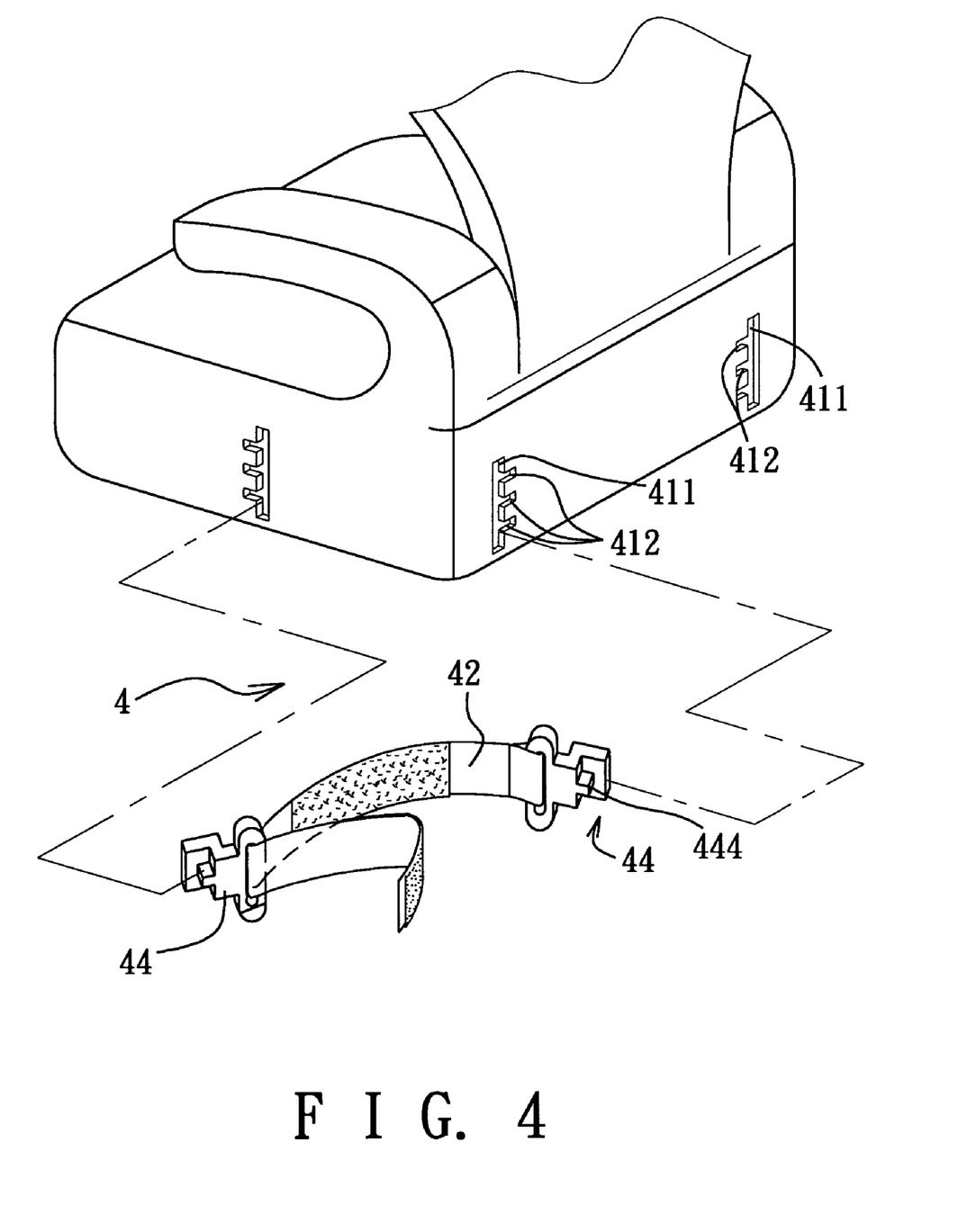
FIG. 4 is a fragmentary perspective view of the third preferred embodiment of a child safety seat assembly according to the present invention.

Referring to FIG. 4, the third preferred embodiment of this invention is shown to be similar to the second preferred embodiment, the main differences residing in that: each of the rear side 113 and said one of the lateral sides 111, 112 of the seat body 11 is further formed with a plurality of retaining grooves 412 that are aligned in series and that are transverse to and that are in spatial communication with the retaining hole 411, and that each of the connecting parts 44 is further formed with a tongue 444 protruding therefrom and engageble with a selected one of the retaining grooves 412 in the respective one of the rear side 113 and the lateral side 111 of the seat body 11 so as to permit height adjustment of the fastening belt 42 relative to the seat body 11 relative to said seat body 11.

Figure 5:
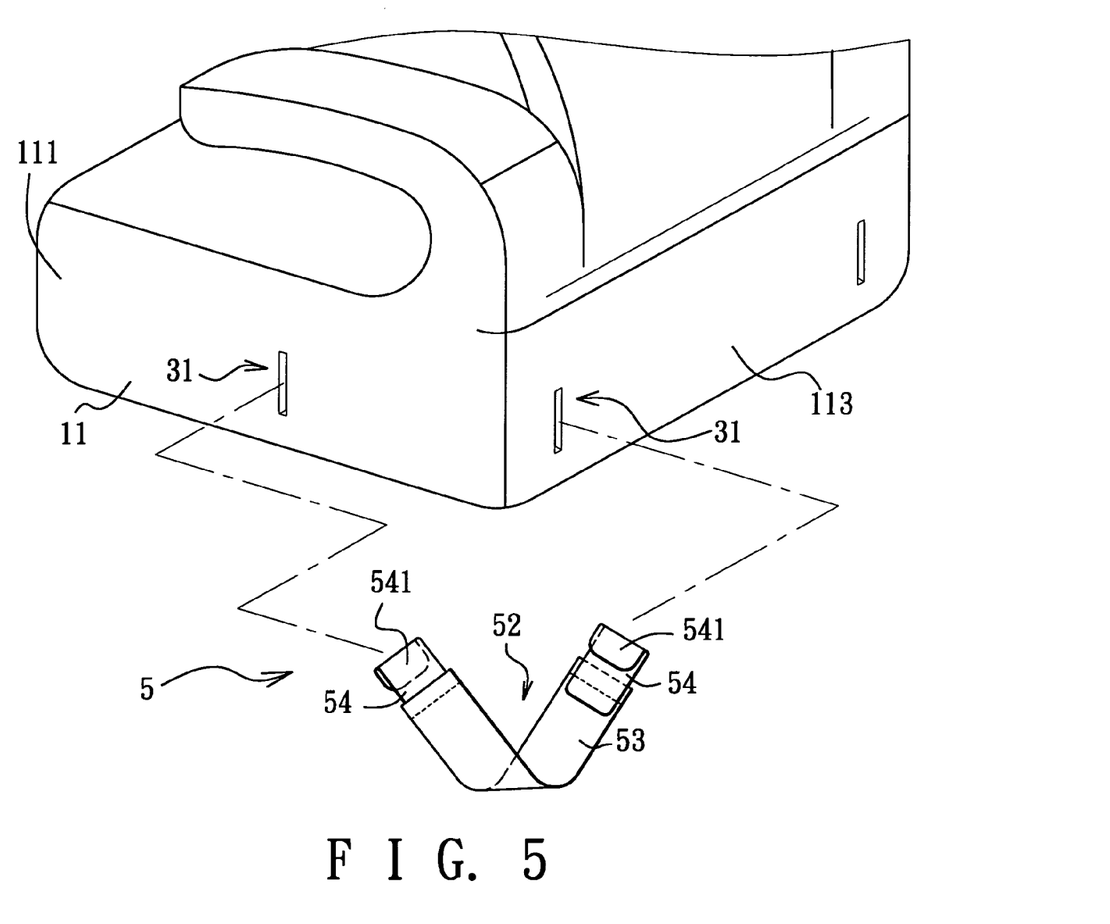
FIG. 5 is a fragmentary perspective view of the fourth preferred embodiment of a child safety seat assembly according to the present invention.

Referring to FIG. 5, the fourth preferred embodiment of this invention is shown to be similar to the second preferred embodiment, the main difference residing in that: the insert 541 of each of the connecting parts 54 of the fastening belt 52 has a hooking end that is engagable with the retaining hole 31 in the respective one of the rear side 113 and the lateral side 111 of the seat body 11. The fastening belt 52 is elastic.

Figure 6:
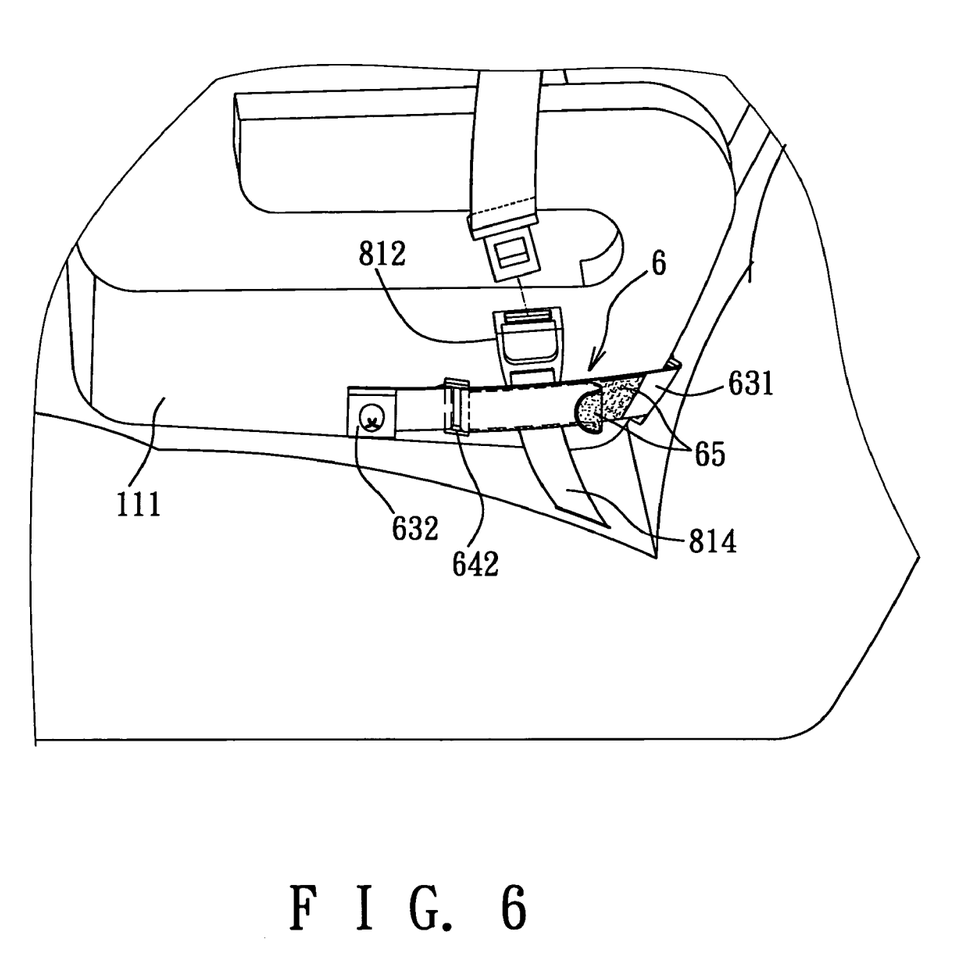
FIG. 6 is a fragmentary perspective view of the fifth preferred embodiment of a child safety seat assembly according to the present invention.

Referring to FIG. 6, the fifth preferred embodiment of this invention is shown to differ from the first preferred embodiment in that the buckle-positioning member 6 includes a non-elastic fastening belt 631, a connecting belt 632, a frame body 642, and hook-and-loop fastening means 65. The fastening belt 631 has a first end portion secured to the rear side 113 of the seat body 11, and a second end portion extending through the frame body 642. The connecting belt 632 has a first end portion secured to one of the lateral sides, such as the lateral side 111 of the seat body 11, and a second end portion connected to the frame body 642. The hook-and-loop fastening means 65 are provided on the first and second end portions of the fastening belt 631 so as to permit engagement between the first and second end portions of the fastening belt 631 and so as to permit distance adjustment between the first and second end portions of the fastening belt 631. The fastening belt 631 and the connecting belt 632 cooperate with the lateral side 111 of the seat body 11 to define a gap. The buckle 812 and the portion of the second belt 814 that is connected to the buckle 812 can be extended through the gap, thereby holding the buckle 812 at the lateral side 111.

Figure 7:
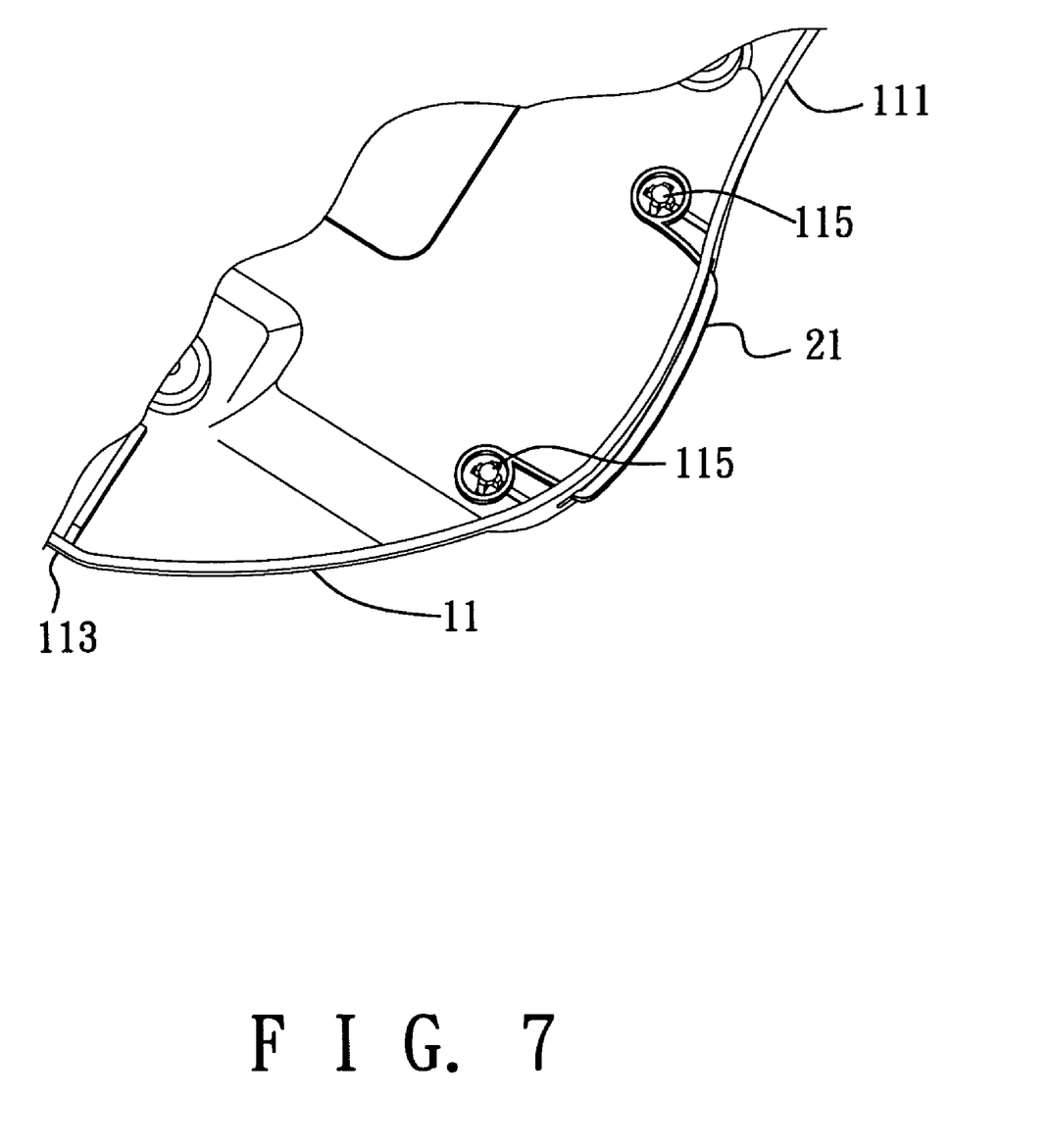
FIGS. 7 and 8 are fragmentary perspective views of the sixth preferred embodiment according to this invention.
Figure 8:
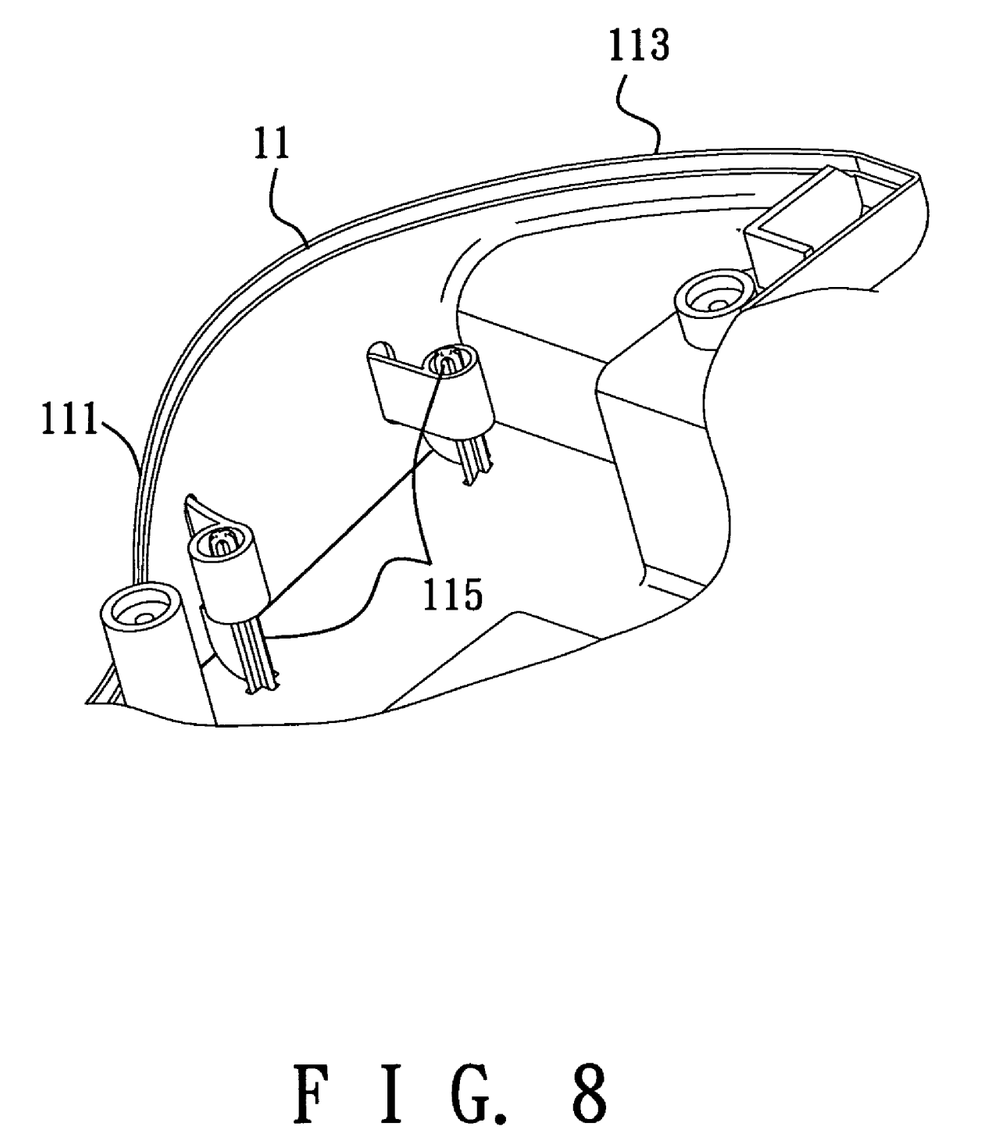

FIGS. 7 and 8 illustrate the sixth preferred embodiment of the child safety seat assembly according to this invention. The child safety seat assembly of this embodiment differs from the first embodiment in that the fastening belt 21 is in the form of an elastic band which has two end portions extending into the seat body 11 and sleeved on a pair of spaced apart rods 115 mounted in the seat body 11, and a middle portion extending between the end portions and disposed outwardly of the seat body 11. In this embodiment, the fastening belt 21 is disposed at a corner between the lateral side 111 and the rear side 113.

With the inclusion of the buckle-positioning member 2 in the child safety seat assembly of this invention, the aforesaid drawbacks associated with the prior art can be eliminated.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A child safety seat assembly adapted to be mounted on a vehicle seat with a safety belt unit that includes a first belt provided with a catch, and a second belt provided with a buckle for engaging the catch, said child safety seat assembly comprising:
   a seat body having two opposite lateral sides; and
   a buckle-positioning member that is provided on said seat body and that is operable to hold the buckle at one of said lateral sides of said seat body;
   wherein said buckle positioning member includes a band with two end portions secured to said seat body so as to fasten the buckle to said one of said lateral sides of said seat body, and wherein said buckle positioning member further includes a pair of spaced apart rods secured to said seat body, said end portions of said band being connected to said rods, respectively.

2. The child safety seat assembly as claimed in claim 1, wherein said band is elastic.

3. A child safety seat assembly adapted to be mounted on a vehicle seat with a safety belt unit that includes a first belt provided with a catch, and a second belt provided with a buckle for engaging the catch, said child safety seat assembly comprising:
   a seat body having a lateral side; and
   a buckle-positioning member that is provided on said seat body and that is adapted to restrain releasably the second belt along said lateral side of said seat body;
   wherein said buckle positioning member includes a band with two end portions secured to said seat body so as to fasten the buckle to said lateral side of said seat body, and wherein said buckle positioning member further includes a pair of spaced apart rods secured to said seat body, said end portions of said band being connected to said rods, respectively.

4. The child safety seat assembly as claimed in claim 3, wherein said band is elastic.

5. A child safety seat assembly for mounting on a vehicle seat having a passenger restraining device that includes a buckle and a catch engageable with said buckle, said child safety seat assembly comprising:

a seat body having a lateral side adapted to be disposed adjacent to the buckle; and a buckle positioning member supported on said seat body and adapted to engage the buckle in such a manner to restrain the buckle along said lateral side, thereby facilitating operation of engaging the catch with the buckle;

wherein said buckle positioning member includes a band with two end portions secured to said seat body so as to fasten the buckle to said lateral side of said seat body, and wherein said buckle positioning member further includes a pair of spaced apart rods secured to said seat body, said end portions of said band being connected to said rods, respectively.

6. The child safety seat assembly as claimed in claim 5, wherein said band is elastic.

* * * * *